United States Patent [19]

Tanaka et al.

[11] Patent Number: 5,479,534
[45] Date of Patent: Dec. 26, 1995

[54] IMAGE READING APPARATUS

[75] Inventors: Kazuyoshi Tanaka, Hachioji; Masahiro Yamaguchi, Yokohama; Nagaaki Oyama, Yokohama; Toshio Honda, Yokohama, all of Japan

[73] Assignee: Konica Corporation, Tokyo, Japan

[21] Appl. No.: 392,394

[22] Filed: Feb. 22, 1995

Related U.S. Application Data

[63] Continuation of Ser. No. 764,425, Sep. 23, 1991, abandoned.

[30] Foreign Application Priority Data

Nov. 29, 1990 [JP] Japan ................................. 2-331748
Nov. 29, 1990 [JP] Japan ................................. 2-331749

[51] Int. Cl.$^6$ ............................................ G06K 9/00
[52] U.S. Cl. ........................ 382/167; 358/518; 358/525
[58] Field of Search .............................. 382/167, 191, 382/205, 323; 358/518, 525

[56] References Cited

U.S. PATENT DOCUMENTS

| | | | |
|---|---|---|---|
| 4,271,428 | 6/1981 | Herbst | 358/54 |
| 4,477,833 | 10/1984 | Clark et al. | 358/525 |
| 4,672,433 | 6/1987 | Yamamoto et al. | 358/525 |
| 4,734,759 | 3/1988 | Kobori et al. | 358/525 |
| 4,796,085 | 1/1989 | Shinada | 358/525 |
| 4,992,861 | 2/1991 | D'Errico | 358/525 |
| 5,227,872 | 7/1993 | Yamaguchi | 358/518 |

OTHER PUBLICATIONS

Ozawa et al., "A CCM Method for Chrominance Moire Reduction in Single Chip Color Video Cameras" IEEE Trans on Electron Devices, vol. 38 No. 5, May 1991.

Primary Examiner—Leo H. Boudreau
Assistant Examiner—Gregory Stephens
Attorney, Agent, or Firm—Frishauf, Holtz, Goodman, Langer & Chick

[57] ABSTRACT

A technique for estimating an unsampled color data on the basis of plural color data sampled by a line image sensor. The sensor includes at least two types of color filters such as a red filter and a green filter. Those filters are alternately arranged pixel by pixel in a line of pixels so that A-type color data which corresponds to green data is sampled from a target pixel and plural B-type color data which correspond to red data are sampled from neighbor pixels neighboring the target pixel. An unsampled B-type color data of the target pixel is estimated by synthesizing the sampled A-type color data of the target pixel and the sampled B-type color data of the neighbor pixels.

12 Claims, 9 Drawing Sheets

1 LINE IMAGE SENSOR $$\widehat{f}^r(x) = f_s^r(x) * a^r(x) + f_s^g(x) * a^g(x)$$

$$\widehat{f}^g(x) = f_s^r(x) * b^r(x) + f_s^g(x) * b^g(x)$$

$\widehat{f}^r, \widehat{f}^g$ : ESTIMATED VALUE OF R,G DATA
$f_s^r, f_s^g$ : SAMPLED VALUE OF R,G DATA
$a^r, a^g$ : INTERPOLATION COEFFICIENT FOR ESTIMATING R-DATA
$b^r, b^g$ : INTERPOLATION COEFFICIENT FOR ESTIMATING G-DATA $$f_s^r(x) = \sum_K [f^r(x) + n^r(x)]\delta(x - 2kd)$$

$$f_s^g(x) = \sum_K [f^g(x) + n^g(x)]\delta(x - 2kd - d)$$

$f^r, f^g$ : ORIGINAL VALUE OF R, G DATA
$n^r, n^g$ : NOISE TERMS k ; 0, 1, 2, · · · · N−1

FIG. 7

$$\begin{cases} e_r^2 = E\{[f^r(x) - \hat{f}^r(x)]^2\} \\ e_g^2 = E\{[f^g(x) - \hat{f}^g(x)]^2\} \end{cases}$$

E : A SET MEANS

FIG. 8

$$\begin{pmatrix} [R_{f^r f^r}(s)] & [R_{f^r f^g}(s)] \\ [R_{f^r f^g}(s)] & [R_{f^g f^g}(s)] \end{pmatrix} \begin{pmatrix} (a^r) \\ (a^g) \end{pmatrix} = \begin{pmatrix} (R_{f^r f}(s)) \\ (R_{f^r f}(s)) \end{pmatrix}$$

$$\begin{pmatrix} [R_{f^r f^r}(s)] & [R_{f^r f^g}(s)] \\ [R_{f^r f^g}(s)] & [R_{f^g f^g}(s)] \end{pmatrix} \begin{pmatrix} (b^r) \\ (b^g) \end{pmatrix} = \begin{pmatrix} (R_{f^r f^\alpha}(s)) \\ (R_{f^g f^\alpha}(s)) \end{pmatrix}$$

$[R_{f^r f^g}(s)]$ : SUB-MATRIX RELATIVE BETWEEN $f^r(x)$ AND $f^g(x+s)$

FIG. 9

$$\begin{bmatrix} R_{f^r f^r}(0)+\sigma^r & R_{f^r f^r}(2d) & R_{f^r f^g}(d) \\ R_{f^r f^r}(2d) & R_{f^r f^r}(0)+\sigma^r & R_{f^r f^g}(-d) \\ R_{f^r f^g}(d) & R_{f^r f^g}(-d) & R_{f^g f^g}(0)+\sigma^g \end{bmatrix} \begin{bmatrix} a^r(-d) \\ a^r(d) \\ a^g(0) \end{bmatrix} = \begin{bmatrix} R_{f^r f^r}(d) \\ R_{f^r f^r}(d) \\ R_{f^r f^g}(0) \end{bmatrix}$$

$$\begin{bmatrix} R_{f^r f^r}(0)+\sigma^r & R_{f^r f^r}(2d) & R_{f^r f^g}(d) \\ R_{f^r f^r}(2d) & R_{f^r f^r}(0)+\sigma^r & R_{f^r f^g}(-d) \\ R_{f^r f^g}(d) & R_{f^r f^g}(-d) & R_{f^g f^g}(0)+\sigma^g \end{bmatrix} \begin{bmatrix} b^r(-d) \\ b^r(d) \\ b^g(0) \end{bmatrix} = \begin{bmatrix} R_{f^g f^r}(d) \\ R_{f^g f^r}(d) \\ R_{f^g f^g}(0) \end{bmatrix}$$

$$\begin{bmatrix} R_{f^r f^r}(0)+\sigma^r & R_{f^r f^r}(d) & R_{f^g f^r}(2d) \\ R_{f^g f^r}(d) & R_{f^r f^r}(0)+\sigma^r & R_{f^g f^g}(2d) \\ R_{f^r f^g}(d) & R_{f^r f^g}(2d) & R_{f^g f^g}(0)+\sigma^g \end{bmatrix} \begin{bmatrix} a^r(0) \\ a^r(-d) \\ a^g(d) \end{bmatrix} = \begin{bmatrix} R_{f^r f^g}(0) \\ R_{f^r f^g}(d) \\ R_{f^r f^g}(d) \end{bmatrix}$$

$$\begin{bmatrix} R_{f^r f^r}(0)+\sigma^r & R_{f^g f^r}(d) & R_{f^g f^r}(2d) \\ R_{f^g f^r}(d) & R_{f^g f^g}(0)+\sigma^r & R_{f^g f^g}(2d) \\ R_{f^r f^g}(d) & R_{f^g f^g}(2d) & R_{f^g f^g}(0)+\sigma^g \end{bmatrix} \begin{bmatrix} b^r(0) \\ b^g(-d) \\ b^g(d) \end{bmatrix} = \begin{bmatrix} R_{f^r f^g}(0) \\ R_{f^g f^g}(d) \\ R_{f^g f^g}(d) \end{bmatrix}$$

FIG. 10

| IMAGE | SYNTHESIZING | LINEAR INTERPOLATION |
|---|---|---|
| A PERSON | 0.06551 | 0.17201 |
| HOUSE | 0.05018 | 0.10904 |
| GIRL | 0.10168 | 0.13893 |
| HALFTONE | 0.29119 | 0.31349 |

$$e = \left[ \frac{1}{N^2} \sum_i (f[i] - \hat{f}[i])^2 \right]^{\frac{1}{2}}$$

N : THE NUMBER OF PIXELS OF 1 LINE DATA

IMAGE READING APPARATUS

This application is a continuation of application Ser. No. 07/764,425, filed Sep. 23, 1991, now abandoned.

BACKGROUND OF THE INVENTION

The present invention relates to an image reading apparatus. More particularly, it relates to an image reading apparatus comprising color line image sensors having a color filter for every pixel for use in color scanners and color copying machines.

Recent color scanners and digital color copying machines generally use line image sensors such as CCD's for reading images.

The line image sensors have a color filter arranged for every pixel to read color information. There have been many proposals to arrange the color filters.

FIG. 12 shows an example of a prior art line sensor arrangements. In FIG. 12, where R denotes a red pixel, G is a green pixel, and B is a blue pixel, a main scanning line has filters of the same color arranged therein, and two other scanning lines have different color filters arranged therein in a subscanning direction.

The arrangement described above has the advantage that the color filters can be fabricated and mounted rather easily and laterally long filters of the same colors may be easily prepared.

However, in the method shown in FIG. 12, as other color information with respect to a pixel exists in the subscanning direction, preceding and succeeding information has to be read as a scan is made. To do this, the number of the line memories has to be increased.

In order to solve such a problem, the inventors proposed a CCD line sensor in which, as shown in FIG. 11, red and green pixels were alternately arranged on a line, while blue pixels were continuously arranged on a different line. Note that a white filter instead of a blue filter may be used. In this case, the blue information can be obtained from the subtraction of the other two signals.

The arrangement of FIG. 11 is desirable because number of line memories can be reduced. However, the inventors found that it had the disadvantage that the resolution in the main scanning direction might be degraded as compared to that of the three-line method discussed above. As the red information, for example, is given for every other pixel, the resolution in the main scanning direction is halved.

The inventors estimated the lost information with use of a linear interpolation method illustrated in FIG. 3. In FIG. 3, where the order of a pixel of interest in the main scanning direction is denoted by i, green information G(i) on a green (G) channel can be obtained quickly. However, red information R(i) cannot be obtained. To overcome this, adjoining red informations R(i−1) and R(i+1) are brought in to make a mean signal R(i) of both signals. Of course, other informations R(i±2d+1), where d is an integer) can be used to increase the resolution. In any case, the other red informations are estimated from the known red information only.

After the inventors considered the linear interpolation method, they found that there is a limitation in the interpolation effect, particularly in reproducing a monochrome image in which false colors are mixed in the reproduced image, resulting in an increase of errors in a reproduced image compared with an original image. At a boundary where the region of a character changes to a non character region, for example, the original image changes from black to white as in a digital mode. However, the linear interpolation estimation does not change the information values of red and green to zero, but causes recognition of false colors.

SUMMARY OF THE INVENTION

In view of the foregoing, it is a general object of the present invention to increase image quality by reducing the reproduction error with a decreased number of necessary line memories.

In the present invention, the estimation is carried out in such a way that weighed coefficients are given to the color information obtained through the color filter for the pixel concerned and to the aiming color information obtained through color filters for at least two pixels adjoining the concerned pixel. In other words, in the estimation of R(i) mentioned above, the known green information G(i) in the same pixel is used. In this new method, the ordinary even interpolation technique is not used, but the interpolation considering the texture and the like of the image concerned and changing the interpolation characteristics as occasion may demand is carried out.

When the signal level changes in a digital mode in the information obtained through the color filter for the pixel concerned (and/or the information obtained from other pixels of the same color), and the pixel to be reproduced is judged to be monochrome, the estimation by interpolation is not made, but the actual information (intensity information) obtained through the pixel concerned is used for the reproduction. This can improve the reproducibility of images.

For estimating alternating red and green information as described above, a color synthesizing method is used. That is, an estimated value $\hat{f}_j(x)$ can be given by the following equation.

$$\hat{f}_j(x) = \Sigma_i [f_i(x) * a_{ij}(x)]$$

with j being an unsampled color component data of the target pixel to be estimated, where i and j are any one of R, G and B, and where two or more colors are used for estimation. A coefficient $a_{ij}$ can be calculated with use of a determinant that minimizes the mean square error of the actual image value and estimated value.

The ordinary linear interpolation method uses only one color information obtained through the red pixel (red filter) to estimate the red information. Instead, the color synthesizing method according to the present invention does not only use the red information, but also uses additional information obtained through the green pixel at a position at which interpolation is made (plus other green pixels as needed), and the coefficient $a_{ij}$ is determined to minimize the mean square error on the basis of the information obtained through at least two color filters.

For example, when the information obtained through the green pixel to be interpolated can be determined to be monochrome as the intensity changes in a digital mode, the coefficient for the red information is made to be zero to prevent a false red color to be caused and to reproduce the image according to the intensity with the only use of the green information.

As described above, the image reading apparatus according to the present invention can improve the image quality in the way that considering the characteristics of an image to be reproduced, a better approximate solution to the original image is made by changing the coefficients so that the characteristics can be reproduced as close as possible with use of at least two items of color information.

BRIEF DESCRIPTION OF THE DRAWINGS

FIG. 7 illustrates contents of the mean square error.

FIG. 8 illustrates contents of a determinant for obtaining a value for minimizing the error e given in FIG. 7.

FIG. 9 illustrates contents of the determinant used in a computer simulation.

FIG. 10 illustrates effects of the embodiments of the present inventions.

DETAILED DESCRIPTION OF THE PREFERRED EMBODIMENTS

Figure 4:
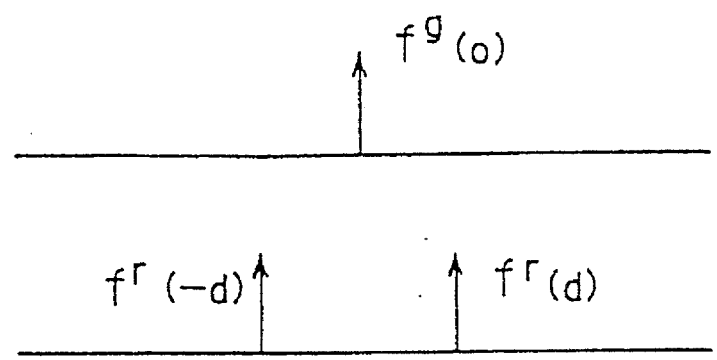

FIG. 4 illustrates principles of the present invention where d indicates a pitch between pixels, and $f^r(X)$ is the density of red R at the pixel X. Let a channel at position 0 be green. $f^g(0)$ is known. On the other hand, $f^r(0)$ itself cannot be obtained in terms of data, and has to be estimated by analogy. Red information $f^r(-d)$ and $f^r(d)$ at both adjoining pixels are already known. Assuming $f^r(0)$ can be obtained on the analogy of the three data, the red information can be obtained by following equation. (See FIG. 4).

$$f^r(0) = a_r(-d) * f^r(-d) + a_r(d) * f^r(d) + a_g(0) * f^g(0) \quad (1)$$

where $a_r(-d)$ is a coefficient for the red information at a position $-d$, and $a_g(0)$ is a coefficient for the green information at a position 0.

To obtain these three coefficients $a_r(+d)$, $a_r(-d)$, and $a_g(0)$ is the objective in the invention.

In a simple example where $a_r(-d)=a_r(d)=\frac{1}{2}$ and $a_g(0)=0$, mere linear interpolation is used, but the green information is not used.

On the other hand, for $a_g(0)=1$, only the green information for the pixel concerned is used. This occurs, for example, in monochrome image data and the like.

As the coefficients are changed by the image information in that way, better approximate solutions can be obtained.

The following describes the method for determining the coefficient with use of the image information. Assuming the coefficients can be obtained in Eq. (1), the approximation can be made when the difference between the estimated coefficient value $\hat{f}^r$ and an unknown actual value $f^r$ is small. In other words, the coefficients should be determined so that the mean square error of the estimated value and the actual value will be minimum. This means that the coefficients should be derived under a restricted condition that the mean square error partially differentiated by the respective coefficients should be made zero.

$$e_r^2 = E[(\hat{f}^r - f^r)^2]$$

where E is a set mean. The coefficients should be determined so that the result can be made minimum.

Therefore, the following equation should be solved.

$$\frac{\partial e_r^2}{\partial a_r(\pm d)} = 0, \quad \frac{\partial e_r^2}{\partial a_g(0)} = 0$$

Then, the following determinant can be obtained.

$$\begin{pmatrix} Rf^rf^r(0) & Rf^rf^r(2d) & Rf^gf^r(d) \\ Rf^rf^r(2d) & Rf^rf^r(0) & Rf^rf^g(d) \\ Rf^gf^r(d) & Rf^rf^g(d) & Rf^gf^g(0) \end{pmatrix} \times \begin{pmatrix} a^r(d) \\ a^r(-d) \\ a^g(0) \end{pmatrix} = \begin{pmatrix} Rf^rf^r(d) \\ Rf^rf^r(d) \\ Rf^rf^g(0) \end{pmatrix}$$

wherein R is a correlation set mean, which is $$Rf^rf^r(t) = E[f^r(X)f^r(x-t)]$$

This is a set mean of autocorrelation coefficients for a distance t of a certain section X.

Similarly, we can obtain $$Rf^rf^g(t) = E[f^r(X)f^g(x-t)]$$

$$Rf^gf^g(t) = E[f^g(X)f^g(x-t)]$$

By calculating the determinant mentioned above, we can obtain the concerned coefficients $a_r(+d)$, $a_r(-d)$, and $a_g(0)$.

The correlation coefficient on the left side of the determinant can be obtained by calculation. As an example, $Rf^rf^r(2d)$ at the first row and second line is an autocorrelation coefficient for a distance 2d. As red appears every two pixels, the product of multiplication of the values of adjacent red pixels should be averaged for a certain section, say, for one main scanning line.

However, the right side terms cannot be obtained as it is. For example, $Rf^rf^r(d)$ is the autocorrelation coefficient for the distance d, but cannot be directly obtained because of the fact that the red pixel exists every two (2d)s.

As $Rf^rf^r(0)$ and $Rf^rf^r(2d)$ are known, the autocorrelation coefficient is obtained by estimation. It is found that a better approximation can be made by making an analogy between the correlation coefficient and specified function.

Similarly, as $Rf^rf^g(0)$ cannot be obtained, this is made by analogy from the known $Rf^gf^r(d)$ or the like. The other coefficients can be obtained in the way described above.

It will be understood that the obtaining of the coefficients is not limited to the red channel discussed above as an example, but extends to the green channel.

As described above, the coefficients can be calculated, and the estimated values are fed out to a write system.

Figure 1:
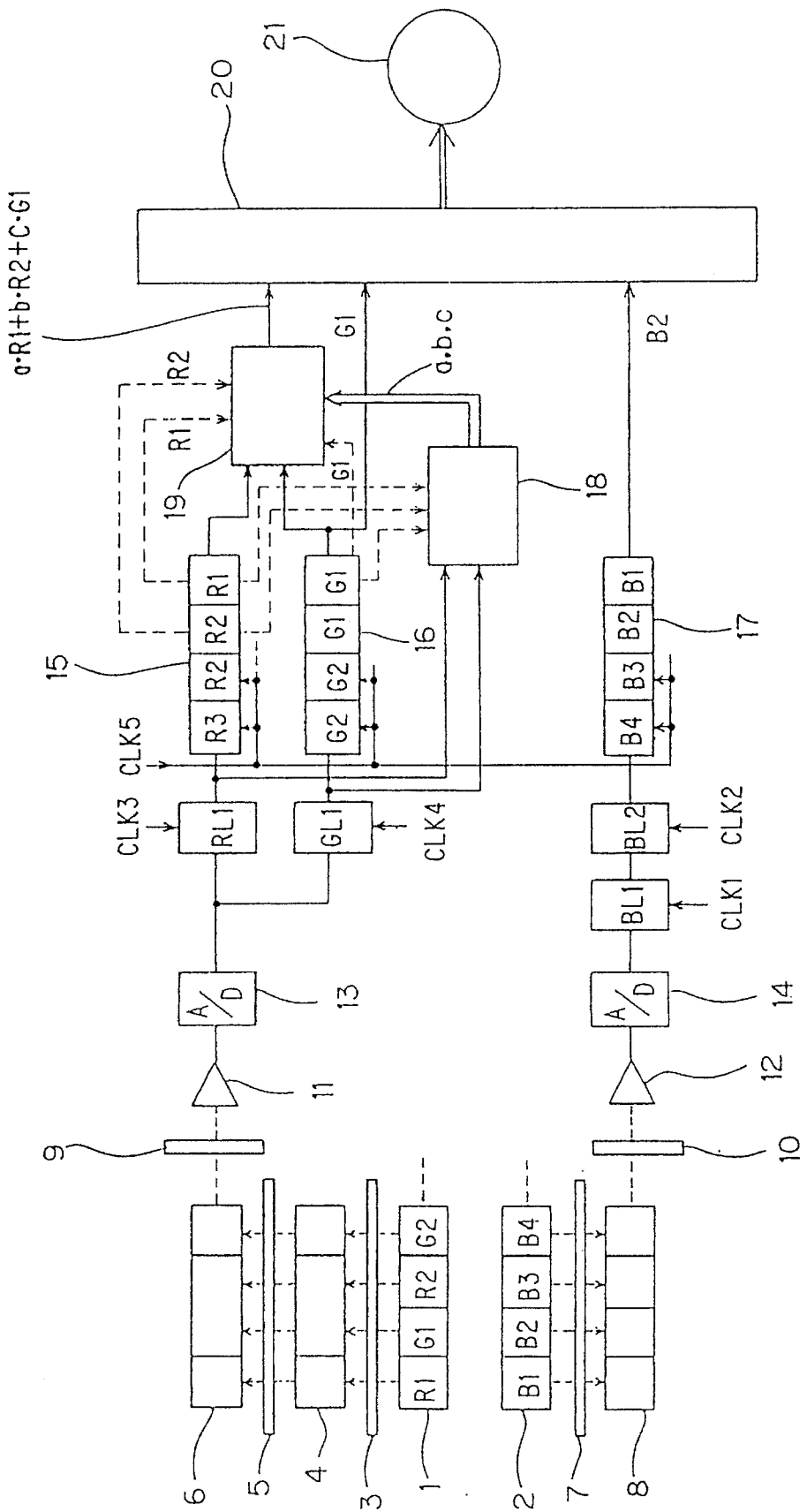
FIG. 1 is a first embodiment illustrating the major sections of the image reading apparatus according to the present invention.

FIG. 1 shows an example of major sections of the image reading apparatus executing the calculations described above. The red and green data accumulated in a line sensor 1 is fed out through a timing adjusting buffer memory 4 and a shift register 6. The output signal is amplified through an analog amplifier 11, and is converted to digital data by an A/D converter 13. On the other hand, the blue data accumulated in a line sensor 2 is fed out through a shift register 8. The output signal is amplified through an analog amplifier 12, and is converted to digital data by an A/D converter 14. FIG. 1 also shows transfer control gates 3, 5, 7, 9, and 10.

Figure 2:
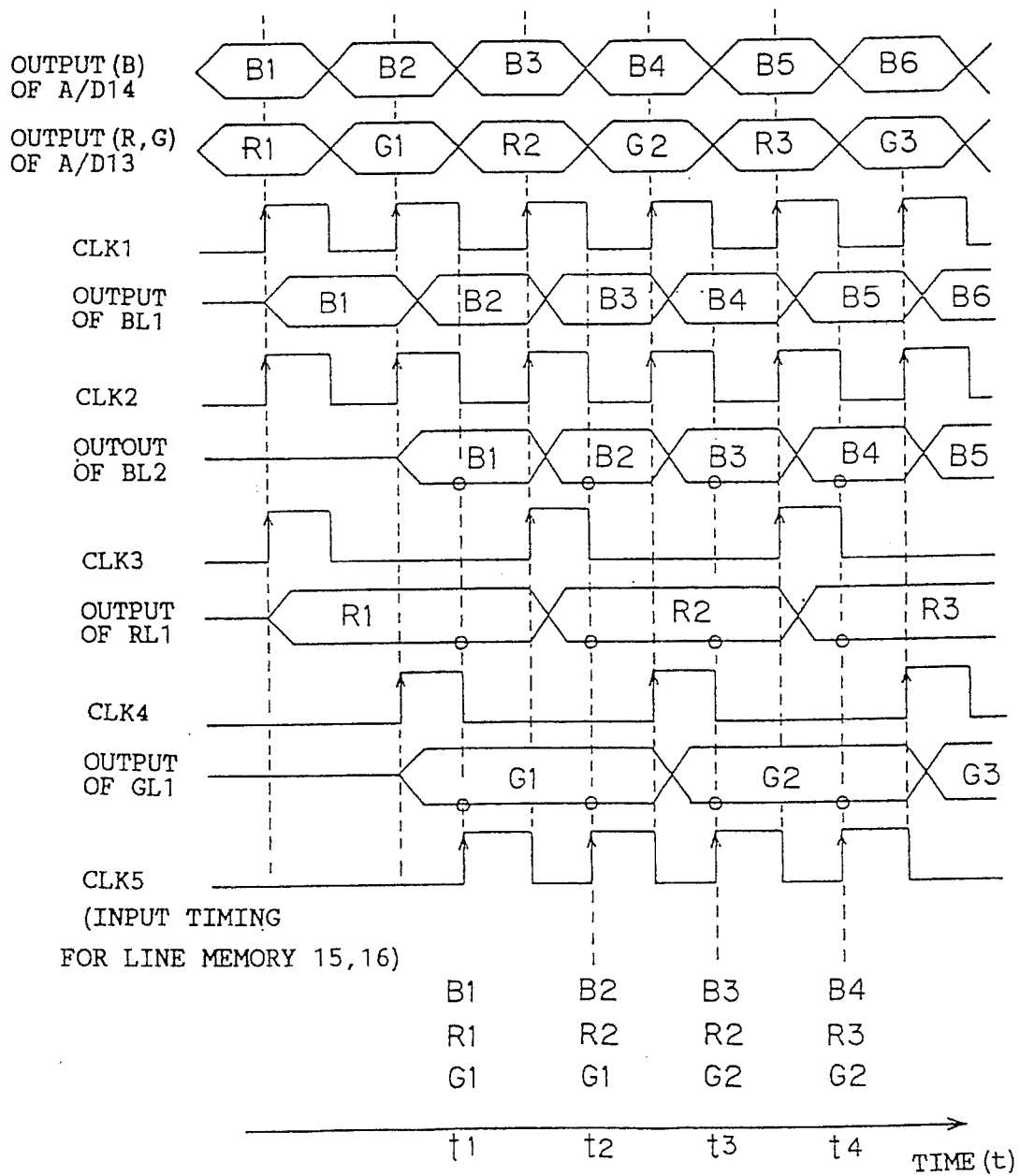
FIG. 2 is a timing chart illustrating the operation in the first embodiment given in FIG. 1.
Figure 3:
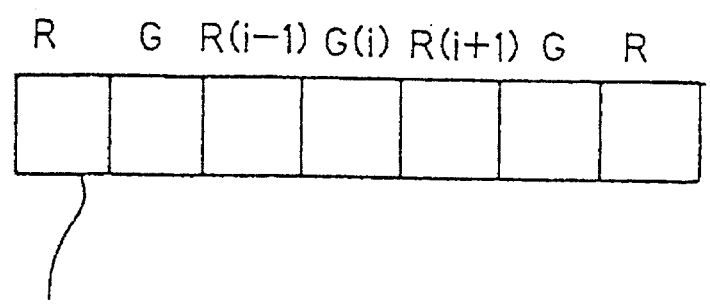
FIGS. 3 and 4 illustrate principles of the present invention.

Red, green, and blue latches RL1, GL1, BL1, and BL2 are provided to combine the three color data. If clocks CLK1 through CLK5, as shown in FIG. 2, are input, combinations of R, G, and B are output at times t1, t2, t3, and t4, as shown. The respective combinations are temporarily stored in color line memories 15, 16, and 17.

The process is made to proceed for every line. As the data are stored in the line memories 15, 16, and 17, product calculation of adjacent terms are sequentially made for correlation coefficient calculation by a coefficient circuit 18. When the product calculation is completed for one line, set means of the correlation coefficients are calculated. Data estimation is executed to derive necessary coefficients a, b, and c corresponding, respectively, to $a_r(-d)$, $a_r(d)$, and $a_g(0)$.

In turn, data before one line is read from the line memories 15 and 16 at the next line reading instant. Calculation is made in terms of the obtained coefficients a, b, and c by an integrator 19. The final result is fed out to a write system 20. At the same time, the blue data also are input to the write system 20. Such a calculation process is made for every line to obtain desired results. Note that FIG. 1 illustrates the analogy of the red data at the position of the green pixel G1, and indicates the signal process flows by dotted arrows.

In the above-described embodiment, the two adjacent pixels are taken as an example. As should be apparent, a larger number of pixels can be treated using the same theory.

In the above-described embodiment, the set mean is taken on the whole line. Alternatively, calculation can be made on sectioned areas. In this way, the coefficients can be changed for better approximation even if the texture of the image changes on a line, for example, in the case that the right half of the image has a photograph and the left half of the image has characters. This provides far better approximation. In this case, the set mean has to be taken only on necessary areas while a product of adjacent terms is always being calculated.

As described so far, the image reading apparatus of the present invention has the advantage of obtaining information closer to the original image than the usual simple linear interpolation method. This is due to interpolation with use of other color information as occasion may demand, without fixing the interpolation coefficients.

As a result of a simple experiment made by the inventors, it was confirmed that the mean square error of the output image with the original character image could be decreased to a great extent as compared with the simple linear interpolation.

In turn, a method of determining coefficients as above-mentioned is further explained with reference to the accompanying drawings.

Figure 5:
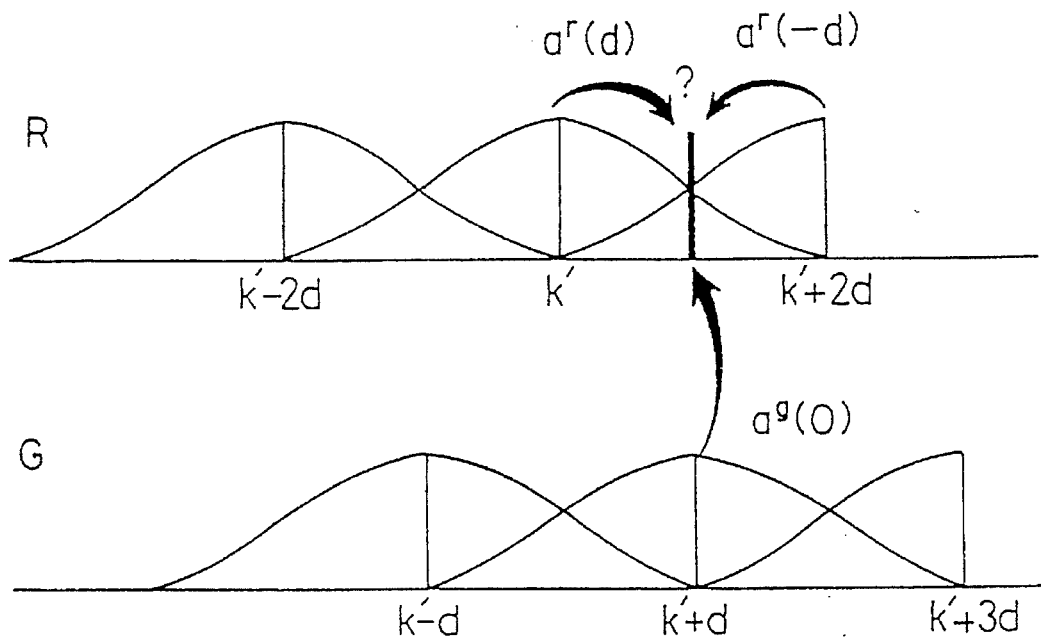
FIG. 5 illustrates principles of the color synthesizing method of the present invention.
Figure 6:
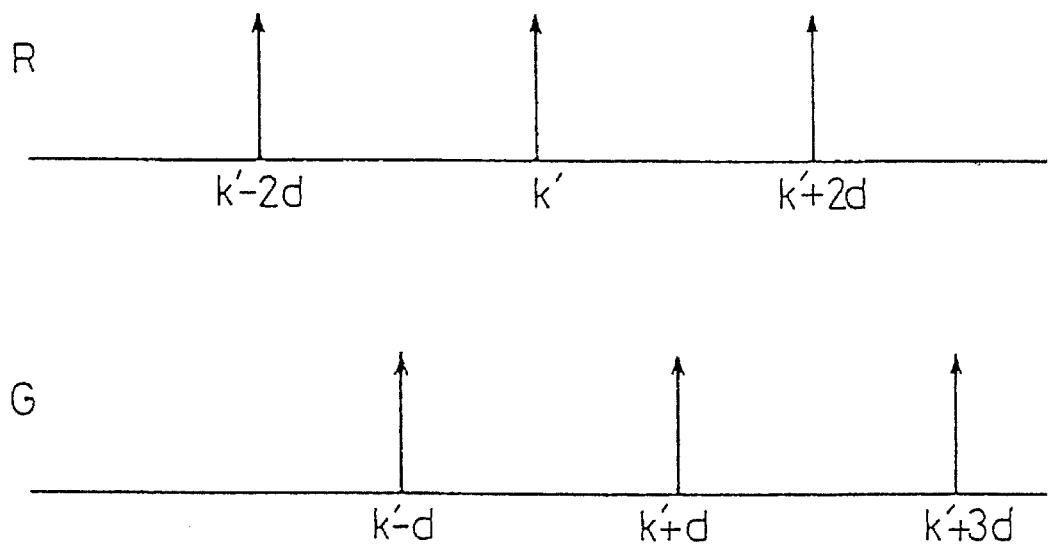
FIG. 6 illustrates the definitions of the functions used in FIG. 5.
Figure 12:
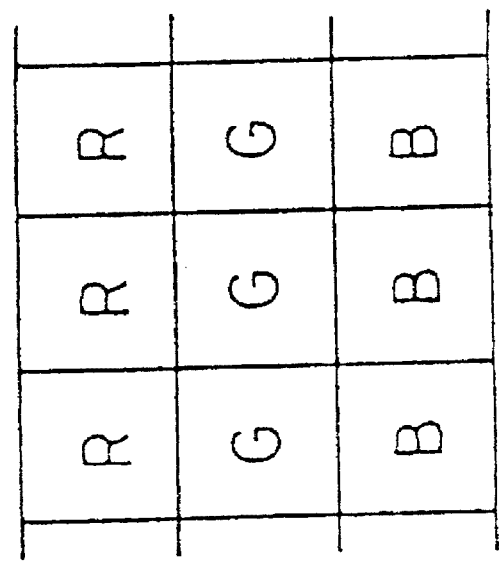
FIG. 12 illustrates a pixel arrangement of an ordinary three-line CCD line sensor.

FIG. 5 illustrates the principles of the embodiment. FIG. 6 illustrates the definitions of functions used in FIG. 5.

Figure 11:
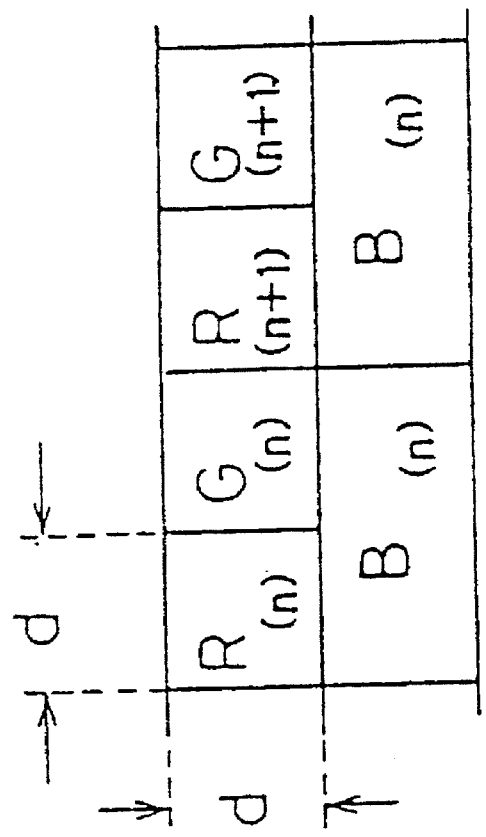
FIG. 11 illustrates a pixel arrangement of a CCD line image sensor used in the present invention.

Let the width of red (R) and green (G) pixels be denoted by d as shown in FIG. 11. The red and green information, as shown on the upper row in FIG. 6, are obtained every 2d, respectively.

In FIG. 5, $f_s^r(X)$ and $f_s^g(X)$ are defined as shown in the middle of the figure with use of original values $f^r$ and $f^g$, noise terms $n^r$ and $n^g$, and a weight coefficient $\delta$, where s means a sample value.

In the embodiment, as shown in the upper curves in FIG. 5, interpolation for red, for example, for X=0, should be made by use of not only the red information on both sides separated d (plus other red pixel information as needed), but also at least the green information at the position concerned (plus other red pixel information as needed).

Estimated values by interpolation, as shown in FIG. 5, are shown in the summation of the multiplications of the interpolation coefficients ($a^r$ and $a^g$ or $b^r$ and $b^g$) and the functions concerning the information of R and G defined in FIG. 6. The interpolation coefficients $a^r$ and $a^g$ or $b^g$ and should be determined so that the mean square errors $e_r^2$ and $e_g^2$ of the estimated values $\hat{f}^r$ and $\hat{f}^g$ and the actual values can be minimized (FIG. 7).

Solutions that minimize the mean square errors can be obtained by solving the determinant given in FIG. 8, or by multiplying the inverse matrix from the left side.

In order to compare effects of the color synthesization in the embodiment with those of the ordinary linear interpolation, the inventors made a computer simulation under the following conditions.

Data: Color image of 256×256 pixels.
Sampling rate: 2 pixels (Size of the R and G sensors is 1 pixel each.)
Sampled data: R and G.

Estimation was made both for the color synthesization in the embodiment and the ordinary linear interpolation. The correlation coefficients $R_f^r{}_f^r(S)$ and $R_f^r{}_f^g(S)$ were obtained by $$R_f^r{}^r(S) = \sum_{-1} f_s^r(X_i) f_s^r(X_i + S)$$

$$R_f^r{}^g(S) = \sum_i f_s^r(X_i) f_s^g(X_i + S)$$

The correlation coefficients were estimated with exponential functions.

FIG. 9 shows a determinant used in the simulation.
FIG. 10 shows the results of the simulation.

It was proved that the mean square error e for one pixel in the color synthesization was less than that of the linear interpolation even when the kind of the image concerned was changed. This means that the reproducibility in the embodiment is higher that of the linear interpolation.

The image reading apparatus according to the present invention is effective, particularly in the color pixels having high correlation among them. It is not only actually effective for reducing the false colors in reproducing the monochrome image, but it is also effective for reducing error in reproducing the color image.

As described above in detail, the image information estimation with use of the color synthesizing method of the present invention has the advantage of improving the image quality with the false colors reduced in the reproduced image even if the simplified two-line linear image sensor is used. The advantage is accomplished in the way that interpolation of one color has other color information added, and the interpolation coefficients are changed to synthesize information according to the information so that the error can be minimized.

What is claimed is:

1. A method of producing at least two types of color component data each representing a density level of a specific color component for each pixel so that two lines of color component data are produced from a single line of color component data obtained by a single line image sensor in which a first type color filter for sampling a first type of color component data and a second type color filter for sampling a second type of color component data are alternately arranged pixel by pixel along a single scanning line, comprising the steps of:

reading an image by the single line image scanner so as to sample the first type of color component data and the second type of color component data alternately along a single scanning line;

generating a single line of color component data in which the first type of color component data and the second type of color component data alternate serially in a line, wherein a type of a sampled color component data of a target pixel is different from a sampled color component of neighbor pixels adjacent the target pixel:

storing the single line of color component data;

processing the sampled color component data of the target pixel and the sampled color component data of the neighbor pixels so as to determine unsampled color component data of the target pixel, the step of processing including a first determination step conducted when the sampled color component data of the target pixel is the second type of color component data, the first determination step processing the sampled second type of color component data of a target pixel and the sampled first type of color component data of neighbor pixels, and determining an unsampled first type of color component data of the target pixel by synthesizing the sampled first type of color component data of the neighbor pixels and the sampled second type of color component data of the target pixel;

a second determination step conducted when the sampled color component data of the target pixel is the first type of color component data, the second determination step processing the sampled first type of color component data of the target pixel and the sampled second type of color component data of the neighbor pixels, and determining an unsampled second type of color component data of the target pixel by synthesizing the sampled second type of color component data of the neighbor pixels and the sampled first type of color component data of the target pixel, and a step of reading sequentially the sampled color component data of each pixel from the line of color component data so that each pixel is processed as the target pixel, wherein the first determination step and the second determination step are conducted alternately depending on the type of the sampled color component data of the target pixel so as to determine the unsampled color component data of the target pixel, and each pixel is provided with both the first type of color component data and the second type of color component data, whereby a first data line consisting of the first type of color component data and a second data line consisting of the second type of color component data are produced.

2. The method of claim 1, wherein said step of synthesizing includes:

multiplying each of said sampled first type of color data and said sampled second type of color data with one of a plurality of coefficients, to produce multiplied first type of color data and multiplied second type of color data; and adding said multiplied first type of color data and said multiplied second type of color data.

3. The method of claim 2, further comprising obtaining said coefficients by averaging correlation coefficients between a predetermined number of neighbor pixels neighboring said target pixel.

4. The method of claim 1, wherein said first and second type of color data, respectively are green and red data.

5. The method of claim 4, wherein, wherein said first type of color data of said target pixel is said green data, said unsampled second type of color data of said target pixel is said red data and is estimated by synthesizing said sampled green data of said target pixel and said sampled red data of said neighbor pixels.

6. The method of claim 5, wherein an estimated value $\hat{f}^r$ of said unsampled red data is obtained by the following equations:

$$\hat{f}^r(x) = f_s^r(x)*a^r(x) + f_s^g(x)*a^g(x)$$

$$f_s^r(x) = \sum_K [f^r(x) + n^r(x)]\delta(x - 2kd)$$

$$f_s^g(x) = \sum_K [f^g(x) + n^g(x)]\delta(x - 2kd - d)$$

wherein $f^r$ is a sampled red data and $f^g$ is a sampled green data;

$n^r$ and $n^g$ are noise terms;

$\delta$ is a predetermined weight coefficient;

K is a 0, 1, 2 - - - N–1;

S is a sampled value;

$a^r$ and $a^g$ are interpolation coefficients for estimating an unsampled red data, and said $a^r$ and said $a^g$ are determined so as to minimize a square average error which is obtained by the following equation:

$$e_r^2 = E\{[f^r(X) - \hat{f}^r(X)]^2\}$$

wherein E is a set means.

7. The method of claim 4, wherein, when said first type of color data of said target pixel is said red data, said unsampled second type of color data of said target pixel is said green data and is estimated by synthesizing said sampled red data of said target pixel and said sampled green data of said neighbor pixels.

8. The method of claim 5, wherein an estimated value $\hat{f}^g$ of said unsampled green data is obtained by the following equations:

$$\hat{f}^g(x) = f_s^r(x)*b^r(x) + f_s^g(x)*b^g(x)$$

$$f_s^r(x) = \sum_K [f^r(x) + n^r(x)]\delta(x - 2kd)$$

$$f_s^g(x) = \sum_K [f^g(x) + n^g(x)]\delta(x - 2kd - d)$$

wherein $f^r$ is a sampled red data and $f^g$ is a sampled green data;

$n^r$ and $n^g$ are noise terms;

$\delta$ is a predetermined weight coefficient;

K is a 0, 1, 2 - - - N–1;

S is a sampled value;

$b^r$ and $b^g$ are interpolation coefficients for estimating an unsampled green data, and said $b^r$ and said $b^g$ are determined so as to minimize a square average error which is obtained by the following equation:

$$e_g^2 = E\{[f^g(X) - \hat{f}^g(X)]^2\}$$

wherein E is a set means.

9. An apparatus for producing at least two types of color component data each representing a density level of a specific color component for each pixel, thereby producing two lines of color component data from a single line of color component data, comprising:

a line image sensor in which a first type color filter for sampling a first type of color component data and a second type of color filter for sampling a second type of color component data are alternately arranged pixel by pixel along a single scanning line, the line image sensor generating a single line of color component data in which the first type of color component data and the second type of color component data alternate serially in a line, wherein a type of a sampled color component data of a target pixel is different from a sampled color component of neighbor pixels adjacent the target pixel;

memory means for storing the single line of color component data;

processing means for sequentially reading the sampled color component data of each pixel from the single line of color component data so that each pixel is sequentially processed as the target pixel, and for determining an unsampled type of color component data of the target pixel by synthesizing the sampled type of color component data of the neighbor pixels and the sampled type of color component data of the target pixel, wherein the processing means synthesizes the sampled second type of color component data of the target pixel and the sampled first type of color component data of the neighbor pixels when the sampled color component data of the target pixel is the second type of color component data for determining the unsampled first type of color component data of the target pixel, and the processing means synthesizes the sampled first type of color component data of the target pixel and the sampled second type of color component data of the neighbor pixels when the sampled color component data of the target pixel is the first type of color component data for determining the unsampled second type of color component data of the target pixel, so that the processing means provides each pixel with both the first type of color component data and the second type of color component data and produces a first data line consisting of the first type of color component data and a second data line consisting of the second type of color component data.

10. The apparatus of claim 9, wherein said processing means includes:

coefficient means for determining coefficients so as to minimize a square average error by calculating a set mean of correlation coefficients, and color estimation means for multiplying said sampled first type of and second type of color data by said coefficients determined by said coefficient means to produce respective result signals and for adding said result signals to estimate said unsampled color data.

11. The apparatus of claim 10, wherein said memory means includes:

at least two line memories, one of which stores said sampled first type of color data and the other of which stores said sampled second type of color data, and each of said two line memories has a memory capacity sufficient to store color data corresponding to said line of pixels.

12. The apparatus of claim 11, wherein while said line image sensor is sampling a first line of an image, said memory means stores a sampled first type of and second type of color data of said first line of said image and said coefficient means determines coefficients used for said color data of said first line of said image, and then while said line image sensor is sampling a second line of said image, said color estimation means estimates unsampled first type of and second type of color data of said first line of said image by means of the coefficients determined by said coefficient means.

* * * * *